US010326594B2

(12) United States Patent
Song et al.

(10) Patent No.: US 10,326,594 B2
(45) Date of Patent: Jun. 18, 2019

(54) CUSTOMER DUE DILIGENCE SYSTEM

(71) Applicants: Yuh-shen Song, Porter Ranch, CA (US); Catherine Lew, Porter Ranch, CA (US); Alexander Song, Porter Ranch, CA (US); Victoria Song, Porter Ranch, CA (US)

(72) Inventors: Yuh-shen Song, Porter Ranch, CA (US); Catherine Lew, Porter Ranch, CA (US); Alexander Song, Porter Ranch, CA (US); Victoria Song, Porter Ranch, CA (US)

( * ) Notice: Subject to any disclaimer, the term of this patent is extended or adjusted under 35 U.S.C. 154(b) by 0 days.

(21) Appl. No.: 15/832,663

(22) Filed: Dec. 5, 2017

(65) Prior Publication Data

US 2018/0097628 A1 Apr. 5, 2018

Related U.S. Application Data

(63) Continuation of application No. 15/007,141, filed on Jan. 26, 2016, now Pat. No. 9,866,386, which is a continuation of application No. 14/506,566, filed on Oct. 3, 2014, now Pat. No. 9,288,197, which is a continuation of application No. 13/959,642, filed on Aug. 5, 2013, now Pat. No. 8,870,068, which is a continuation of application No. 13/464,564, filed on May 4, 2012, now Pat. No. 8,500,011, which is a continuation of application No. 12/427,568, filed on Apr. 21, 2009, now Pat. No. 8,191,774, which is a
(Continued)

(51) Int. Cl.
G06K 5/00 (2006.01)
H04L 9/32 (2006.01)
G06F 21/62 (2013.01)
G06F 21/60 (2013.01)
H04L 29/06 (2006.01)
H04L 9/14 (2006.01)

(52) U.S. Cl.
CPC .............. H04L 9/321 (2013.01); G06F 21/60 (2013.01); G06F 21/6254 (2013.01); H04L 9/14 (2013.01); H04L 63/06 (2013.01); H04L 63/08 (2013.01); H04L 65/403 (2013.01)

(58) Field of Classification Search
CPC ..... G06F 21/60; G06F 21/6254; H04L 63/06; H04L 63/08; H04L 65/403; H04L 9/14
USPC ........................................................ 235/380
See application file for complete search history.

(56) References Cited

U.S. PATENT DOCUMENTS 4,552,420 A 11/1985 Eigenbrode
4,864,108 A * 9/1989 Hamada ................. G07F 19/20
235/379
(Continued)

OTHER PUBLICATIONS

International Search Report—PCT/US2006/004493—ISA/US—dated Aug. 17, 2006.

Primary Examiner — Thien M Le
(74) Attorney, Agent, or Firm — Puya Partow-Navid; Seyfarth Shaw LLP

(57) ABSTRACT

A computerized method and apparatus are established to identify confidential data of common interest among multiple parties without releasing the confidential data. Furthermore, a computerized network provides different parties at different locations with a mechanism to conduct cooperative activities concerning such confidential data of common interest without exposing that confidential data to possible identity theft.

12 Claims, 5 Drawing Sheets

Related U.S. Application Data continuation of application No. 11/351,282, filed on Feb. 8, 2006, now Pat. No. 7,533,808.

(60) Provisional application No. 60/651,062, filed on Feb. 9, 2005.

(56) References Cited

U.S. PATENT DOCUMENTS

| | | | |
|---|---|---|---|
| 4,969,824 A | | 11/1990 | Casciotti |
| 4,995,081 A | * | 2/1991 | Leighton .............. G06Q 20/347 235/379 |
| 5,338,207 A | | 8/1994 | Lineberry et al. |
| 5,676,559 A | | 10/1997 | Laub et al. |
| 6,105,011 A | * | 8/2000 | Morrison, Jr. ........ G06Q 20/042 382/137 |
| 6,402,525 B2 | | 6/2002 | Gugliotti et al. |
| 6,549,118 B1 | * | 4/2003 | Seal ................... G06K 9/00597 340/5.52 |
| 6,681,247 B1 | | 1/2004 | Payton |
| 6,866,518 B1 | | 3/2005 | Korsunsky et al. |
| 7,533,808 B2 | | 5/2009 | Song et al. |
| 7,567,944 B2 | | 7/2009 | Mullender et al. |
| 7,599,698 B2 | | 10/2009 | Cheng et al. |
| 7,822,631 B1 | | 10/2010 | Vander Mey et al. |
| 7,882,550 B2 | | 2/2011 | Wray et al. |
| 7,917,447 B1 | | 3/2011 | Smith |
| 8,515,897 B2 | | 8/2013 | Gao et al. |
| 8,870,068 B2 | | 10/2014 | Song et al. |
| 2002/0046157 A1 | | 4/2002 | Solomon |
| 2002/0049642 A1 | | 4/2002 | Moderegger et al. |
| 2002/0069134 A1 | | 6/2002 | Solomon |
| 2003/0074301 A1 | | 4/2003 | Solomon |
| 2003/0139936 A1 | | 7/2003 | Saucier |
| 2003/0149623 A1 | | 8/2003 | Chen |
| 2003/0233305 A1 | | 12/2003 | Solomon |
| 2004/0139008 A1 | | 7/2004 | Mascavage, III |
| 2005/0079257 A1 | | 4/2005 | Neto |
| 2005/0144019 A1 | * | 6/2005 | Murakami ............. G06F 21/10 705/59 |
| 2005/0204017 A1 | | 9/2005 | Graves et al. |
| 2006/0056832 A1 | * | 3/2006 | Yamaguchi ........... G03B 17/00 396/56 |
| 2006/0069619 A1 | | 3/2006 | Walker et al. |
| 2006/0069635 A1 | | 3/2006 | Ram et al. |
| 2006/0239513 A1 | | 10/2006 | Song et al. |
| 2007/0022071 A1 | | 1/2007 | Mullender et al. |
| 2007/0186254 A1 | * | 8/2007 | Tsutsui .................. G06Q 30/02 725/87 |
| 2008/0014926 A1 | * | 1/2008 | Ono ...................... H04W 76/22 455/426.1 |
| 2008/0114737 A1 | | 5/2008 | Neely et al. |
| 2009/0234715 A1 | | 9/2009 | Heiser, II et al. |
| 2009/0271617 A1 | | 10/2009 | Song et al. |
| 2010/0250410 A1 | | 9/2010 | Song et al. |
| 2011/0161192 A1 | | 6/2011 | Moderegger et al. |
| 2011/0173281 A1 | | 7/2011 | Smith |
| 2011/0270661 A1 | | 11/2011 | Heiser, II et al. |
| 2013/0198652 A1 | | 8/2013 | Dunn et al. |
| 2013/0339154 A1 | | 12/2013 | Shimizu et al. |
| 2014/0136328 A1 | | 5/2014 | Abhyanker |
| 2014/0365341 A1 | | 12/2014 | MacLaurin et al. |
| 2015/0178066 A1 | * | 6/2015 | Horn ....................... G06F 8/65 717/161 |
| 2015/0204844 A1 | * | 7/2015 | Nothacker ......... G01N 33/4972 73/23.3 |

\* cited by examiner

Information of the Individual:

1. Last 5 Digits of the Social Security Number: ☐☐☐ - ☐ ☐☐☐☐

2. Last 2 Digits of the Year of Birth: ☐☐

3. Last Digit of the Month of Birth: ☐

4. Last Digit of the Date of Birth: ☐

5. Government Issued Identification Document (please select one)
   ☐ Driver's license / State ID    ☐ Passport    ☐ Alien Registration
   ☐ Other _____

6. Last 4 Digits of the ID Number: ☐☐☐☐ - ☐☐☐☐

7. Initials of the Individual's Name:
   ☐ First Name    ☐ Middle Name    ☐ Last Name 8. Partial Address Information:
   ☐☐☐☐☐ Zip Code (Exclude the 1st) Street Number _____

Figure 4

Information of the Organization:

1. Last 5 digits of the Employer Identification Number (EIN):

[x][x]—[x][ ][ ][ ][ ]

2. Initials of the Organization's Name (leave blank if not applicable):

1st Word    2nd Word    3rd Word    4th Word    5th Word

[ ]        [ ]        [ ]        [ ]        [ ]

3. Partial Address Information of the Organization

Zip Code (Exclude the 1st)    Street Number    Country

CUSTOMER DUE DILIGENCE SYSTEM

CROSS REFERENCE TO RELATED APPLICATIONS

This application is a continuation of U.S. patent application Ser. No. 15/007,141, to Song et al., filed on Jan. 26, 2016, which is a continuation of U.S. patent application Ser. No. 14/506,566, to Song et al., filed on Oct. 3, 2014, now U.S. Pat. No. 9,288,197, which is a continuation of U.S. patent application Ser. No. 13/959,642, to Song et al., filed on Aug. 5, 2013, now U.S. Pat. No. 8,870,068, which is a continuation of U.S. patent application Ser. No. 13/464,564, to Song et al., filed on May 4, 2012, now U.S. Pat. No. 8,500,011, which is a continuation of U.S. patent application Ser. No. 12/427,568, to Song et al., filed on Apr. 21, 2009, now U.S. Pat. No. 8,191,774, which is a continuation of U.S. patent application Ser. No. 11/351,282, to Song et al., filed on Feb. 8, 2006, now U.S. Pat. No. 7,533,808, which claims the benefit of U.S. Provisional Application No. 60/651,062, filed on Feb. 9, 2005, the disclosures of which are expressly incorporated by reference herein in their entireties.

TECHNICAL FIELD

Aspects of the present disclosure generally relate to electronic communications concerning a particular entity without divulging the true identity of the subject individual, organization, or other legal entity. More specifically, one aspect of the present disclosure involves a computerized method and apparatus for sharing information among multiple parties, each having information about identifiable entities of potential interest to the other parties, without disclosure of any private identification information not already known to a recipient.

BACKGROUND

Privacy protection is a serious matter today. Many industries have established their privacy protection guidelines, rules, or regulations, and in many cases, even the government is involved.

For example, in the USA financial industry, the Gramm-Leach-Bliley Act ("GLB Act") requires financial institutions to keep all their customers' non-public personal information confidential. Non-public personal information also includes the identification information of the customers. Other countries have similar laws for privacy protection.

Although the GLB Act has an important purpose, it also provides a form of protection for con artists. For example, if a con artist commits a crime, (e.g., check kiting, between Bank A and Bank B), prevention of this crime is possible if Bank A and Bank B can jointly investigate this case at an early stage.

The chance of Bank A or Bank B jointly investigating this case at an early stage, however, is almost zero because, most likely, Bank A and Bank B may not know that they have a common customer, who is using Bank A and Bank B to commit a financial crime until it is too late.

A joint effort by multiple financial institutions is often required to identify a possible crime at an early stage. The first step to forming this joint effort is to identify a common customer, that has suspicious activities. If a financial institution is not permitted to release the identification information of this suspicious customer, other financial institutions have no way of determining whether they have a common customer.

In theory, a financial institution should be able to determine whether any other financial institution may have a common customer. For example, a common customer may be determined by simply posting the customer's identification information on a shared network and inviting other financial institutions to compare this identification information with the identification information of their own customers. If there is a match, the matched person, organization, or entity is the common customer.

Although financial institutions are permitted to share information for the purposes of crime prevention under the section 314(b) of the USA PATRIOT Act or equivalent laws in other countries, most financial institutions do not take an advantage of these laws because they are afraid of violating the Gramm-Leach-Bliley Act in the USA or the equivalent laws in other countries. That is especially true if it is conceivable that the suspicious activities were perfectly innocent and the customer has not done anything illegal. Moreover, even if a customer consents to the posting of the customer's identification information, it is not desirable to release the identification information of a customer because con artists could possibly access the posted identification information and use it to commit identity theft, which is one of the most common crimes today.

In other words, these conflicting requirements have placed financial institutions in a very awkward position. On one hand, there is an important need for financial institutions to identify a common suspicious customer in order to jointly prevent crimes. On the other hand, financial institutions are not permitted to release any identification information, even if it would assist the financial institution to identify a common suspicious customer.

In this document, the terminology "identification information" generally refers to a set of information that can be used to authenticate the identity of a subject person, organization, or other legal entity. For example, if the subject is a person, such information may include not only the person's name, but also one or more of that person's address, date of birth, identification document or instrument number, type of identification document or instrument, expiration date of identification document or instrument, social security number, driver's license number, etc.

In this document, the terminology "network" or "networks" generally refers to a communication network or networks, which can be wireless or wired, private or public, or a combination of them, and includes the well-known Internet.

In this document, the terminology "computer system" generally refers to either one computer or a group of computers, which may work alone or work together to perform certain system functions.

In this document, the terminology "computer network" generally refers to either one computer network or a group of connected computer networks, which may work alone or work together to perform certain network functions.

In this document, a "bank" or "financial institution" is generally referred to as a "financial service provider" and a "bank account" or "financial account" is generally referred to as an "account in a financial institution" or an "account with a financial service provider".

In this document, the terminology "financial institution" and "financial service provider" generally refers to either banks or non-banks which perform financial transactions (such as deposits, withdrawals, and transfers) involving payment instruments (such as cash, checks, credit cards, debit cards, monetary instruments, electronic fund transfers, etc.).

In this document, the terminology "encoding" generally refers to any type of data manipulation so that an alphanumeric code is generated from a set of data through this data manipulation. The terminology "decoding" generally refers to the reverse data manipulation to transform the "encoded" data back to its original format. Not all encoded information can be decoded. Some coding schemes compress the information contained in the data, such that some information is lost during the encoding process. Sometimes encoding involves encryption which hides the information such that it cannot be decoded or otherwise made visible without access to a secret key.

SUMMARY

One aspect of the present disclosure readily identifies a subject in which multiple parties may have common interest without violating the subject's privacy. Another aspect provides a networked method and apparatus which is used to coordinate joint activities by two or more of those parties, having a common interest in the specific subject.

Although aspects of the present disclosure may be best understood in the context of a specific example involving the identification of a common customer by multiple financial institutions that must comply with the Gramm-Leach-Bliley Act, many aspects of the disclosure may also be applicable for identifying a common person, organization or legal entity for other purposes.

Instead of using the actual identification information of a specific customer, one aspect of the present disclosure may share only a set of "encoded" data ("identity code") that is derived from that identification information.

In accordance with one aspect of the disclosure, if these two sets of encoded data exactly match each other, depending on the method of encoding, the original identification information of two subjects behind these two sets of encoded data should have an excellent probability to match each other.

In accordance with another aspect of the disclosure, if crucial pieces of information are removed during the encoding process, accurate decoding of the original information becomes impossible. Thus, even if the encoding methodology is known, the recipient is unable to recover the original identification information through a decoding process.

Moreover, in another aspect, instead of using the actual identification information of a specific customer, the recipient receives only a set of "encrypted" data ("identity code") that is derived from that identification information. For example, the identity code is preferably encrypted using a known two-key form of encryption in which only the first key used to encrypt the data is shared without disclosing the second key required to decrypt data into a usable format.

In theory, if these two sets of encrypted data exactly match each other, depending on the method of encryption, the original identification information of two subjects behind these two sets of encrypted data may have an excellent probability to match each other.

More importantly, if we purposely hide or destroy the key that is used for decryption, there may be no chance to recover the original identification information, even if the encrypted information in theory contains all the original information and in theory all the original information would be accessible to anyone having access to the decryption key. Thus, even if the key for encryption is known to the public, there is no chance to recover the original identification information because the key for decryption is not available.

In another aspect, encryption is combined with encoding of partial identification information, such that even a person succeeds in decrypting the encrypted information, only partial identification information is recovered and the chance for recovering sufficient identification information to commit fraud or identify theft is practically zero.

To make sure a financial institution can easily follow the same encoding and/or encryption method to derive the shared identity code from the customer's private identification information, so that matching process can be effectively performed, one aspect of the present disclosure uses a computerized method to prompt users to precisely follow the rules of encoding and/or encryption, or otherwise providing a standardize and automated process such that the same identification information is encoded and encrypted in a consistent manner to produce the same results regardless of which user preformed the encoding and/or encryption process.

Once these financial institutions have learned that they have a matching identity code, they may have a common customer who has suspicious activities. These financial institutions can begin discussing the suspicious activities of the common customer privately and confidentially as permitted by law.

In the very unlikely event, if two different persons really turn out to have the same "identity code," it should soon be apparent to the involved financial institutions before any damage is done. In any event, only those financial institutions with the presumably shared customer behind the common identity code have access to corresponding actual identification information, and to the extent they do not exchange information until they have established that the common identity code does not belong to two different individuals (for example, by sharing information about some other pieces of identification information not used to construct the identity code, such as place of birth or mother's maiden name), the actual identification information used by one financial institution to construct the identity code for one of its customers will remain protected even from the other financial institution.

Moreover, this common identity code is essentially meaningless to any other third parties. Even if a computer hacker breaks into the computer database that stores these identity codes, he/she will have great difficulty finding any meaningful information and thus is unable to commit identity theft.

Consequently, one aspect of the present disclosure provides technology to identify a common customer potentially associated with suspicious activities at more than one financial institution without violating the Gramm-Leach-Bliley Act.

Those skilled in the art will undoubtedly recognize that by using different encoding and/or encryption rules to select and encode and/or encrypt different pieces of the available identification information, there will be potentially many different ways to generate an "identity code" that achieves substantially the same objectives. These different ways to encrypt the identification information should not be construed as substantial deviations from aspects of the present disclosure, as hereinafter claimed.

BRIEF DESCRIPTION OF THE FIGURES

For a more complete understanding of the present disclosure, reference is now made to the following description taken in conjunction with the accompanying drawings.

FIG. 4 is an exemplary screen layout of the computer system, which collects, encodes and/or encrypts a set of data to form an identity code for an individual.

FIG. 5 is an exemplary screen layout of the computer system, which collects, encodes and/or encrypts a set of data to form an identity code for an organization.

DETAILED DESCRIPTION

Figure 1:
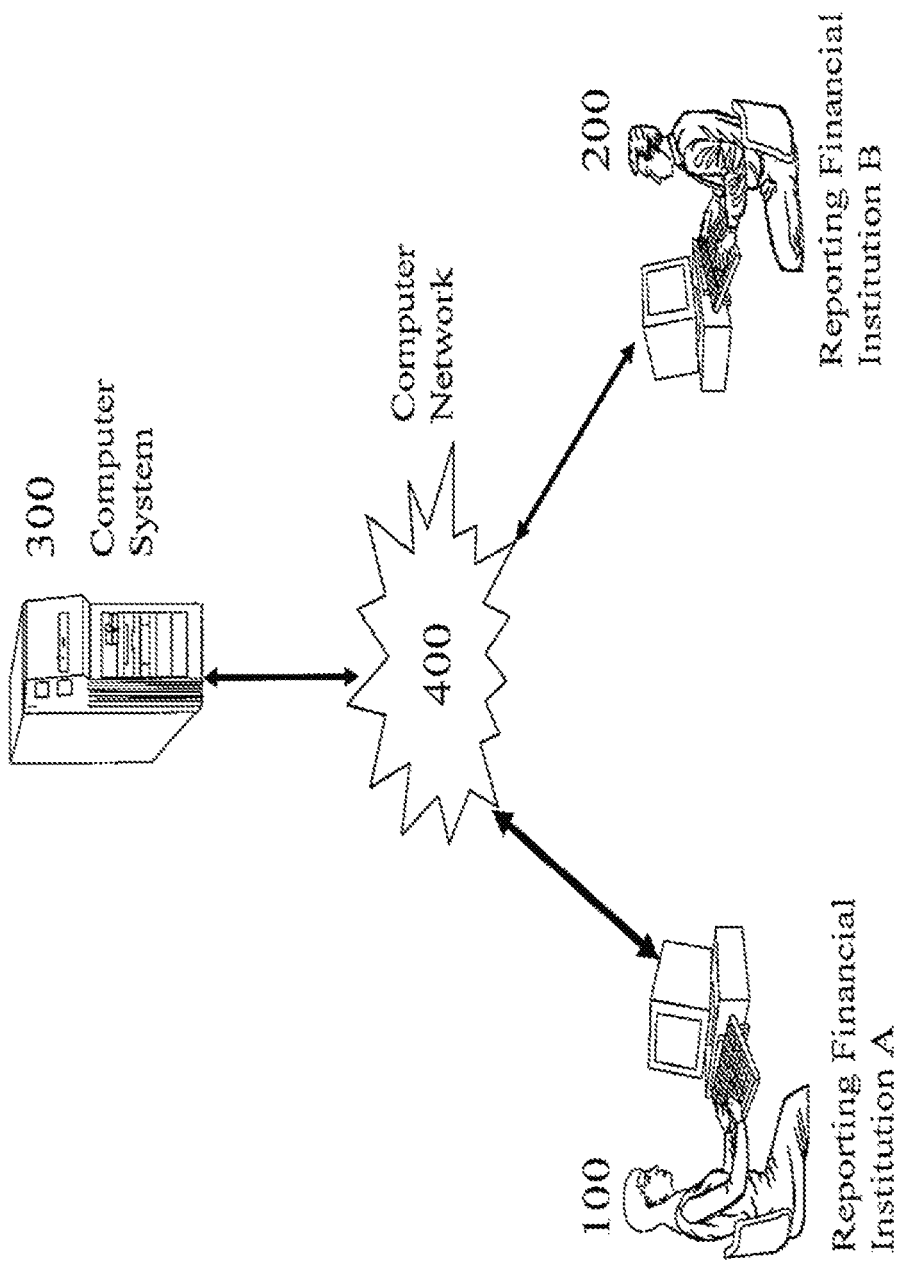
FIG. 1 is an exemplary system diagram with two parties (or, reporting financial institutions) connected to the computer system via a network.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The present disclosure potentially includes a number of aspects to provide maximum flexibility to satisfy the many different needs of both sophisticated and unsophisticated users. Accordingly, only a few examples of certain aspects of the present disclosure (and combinations of those aspects) are described.

An individual is typically identified by his/her name and place of residence, preferably accompanied by a unique government issued identification number (e.g., a social security number, driver's license number, passport number, etc.). Nevertheless, partial identification information (e.g., a person's initials) is far from being sufficient for identification purposes. Similarly, other partial information (e.g., the last four digits of the social security number or driver's license number, the street number, last four digits of the zip code, the last digit of the month of birth, etc.) is also insufficient for identification purposes.

Nevertheless, in one aspect of the present disclosure, if several pieces of such unrelated practical identification information from the same subject are combined together through a pre-agreed data manipulation process, they form a set of encoded data, that can be used as an "identity code".

Similarly, another aspect of the present disclosure provides higher security and privacy by using an advanced encryption technique to encrypt the identification information to form an "identity code." If we purposely hide or destroy the key for decryption, there may be no chance to recover the identification information behind the identity code.

In yet another aspect of the present disclosure, we can combine the above encryption with encoding of partial identification information to form an "identity code," in which the chance of recovering the original identification information from this identity code is practically zero.

Although it is not possible to decode and/or decrypt an identity code to obtain the original identification information, two matched identity codes will signify that the original identification information of two subjects, which both correspond to this matched identity code, may match each other with a very high probability.

For example, the probability for two persons to have the same last five digits in both the social security number and driver's license number is 1 out of $10^{10}$ or 1 out of ten billion. The probability that these two persons also have the same last two digits for year of birth is 1 out of $10^{12}$ or 1 out of one trillion. Furthermore, if these two persons also have the same zip code, the probability becomes 1 out $10^{17}$ if these different types of information are statistically independent, which practically may never happen. By combining these pieces of information together through a pre-agreed data manipulation process, we can construct a set of encoded data, which becomes an "identity code."

Similarly, if we encrypt a sufficient amount of identification information to form an "identity code," the chance of two persons having the same identity code can be reduced to almost zero.

At the same time, third parties are unable to identify the true identity behind this identity code; and thus the privacy of the person is preserved.

An analogous encoding and/or encryption of partial identification information can be used to identify an organization, or any other legal entity, while at the same time maintaining privacy.

A pre-agreed rule or set of rules is used to select, encode and/or encrypt the pieces of partial identification information from a specific subject individual, organization, or other legal entity, to form an identity code. This identity code is essentially unique to that subject and conceptually serves as a public proxy for that subject's private identification information.

In one aspect of the present disclosure, the identity code is established based on a pre-agreed relatively simple transformation of the private identification information such as a straightforward concatenation of only some specified individual digits and letters from the original identification information.

In another aspect of the present disclosure, the identity code is established through a pre-agreed relatively complex transformation of the specified digits and letters. The transformation could include known methods of data encryption and encoding of the selected pieces of the identification data, thus further protecting the privacy of the original identification information from unauthorized access.

Moreover, because only a small and relatively meaningless portion of the private information is used to generate the identity code, even if that portion is recovered by a malicious third party, the privacy of the remaining identification information is preserved and it is not possible to steal the identity of the concerned subject.

In one aspect of the present disclosure, a networked computer has a database, which stores the identity codes of many subjects of potential interest. In addition, for each specific identity code, the computer also stores the contact information of all the parties which may have information concerning or are otherwise interested in the subject that is represented by the specific identity code.

In that aspect, a user logs into a computer via a network and issues a request to the computer to determine whether its database may contain a specific identity code in which the user is interested. If the computer locates the specific identity code that the user is interested in, the computer can provide contact information of those parties, which may have a common interest in this specific identity code. As a result, the user can contact these parties and coordinate their efforts regarding the common subject that is represented by the specific identity code.

In another aspect of the present disclosure, a user logs into the computer via the network and issues a request to the computer to provide a list of identity codes previously determined to be associated with suspicious individuals or otherwise responsive to a specific criteria provided by the user.

Once the user has obtained such a list of identity codes, the user compares its own database with this list and determines whether its own database may contain any subject, which may have a matching identity code. If any identity code on the list that also exists in the user's database, the user may request the computer to provide contact information of all parties that have a common interest in the identity code. As a result, the user can contact those parties and coordinate their efforts regarding the common subject, which is represented by said identity code, without disclosing any identification information about the user's own customer that is not already known to the other users.

As contemplated in certain described aspects, two financial institutions A & B are using the computer system 300 as shown in FIG. 1 to identify common customers that may have suspicious activities.

Figure 2:
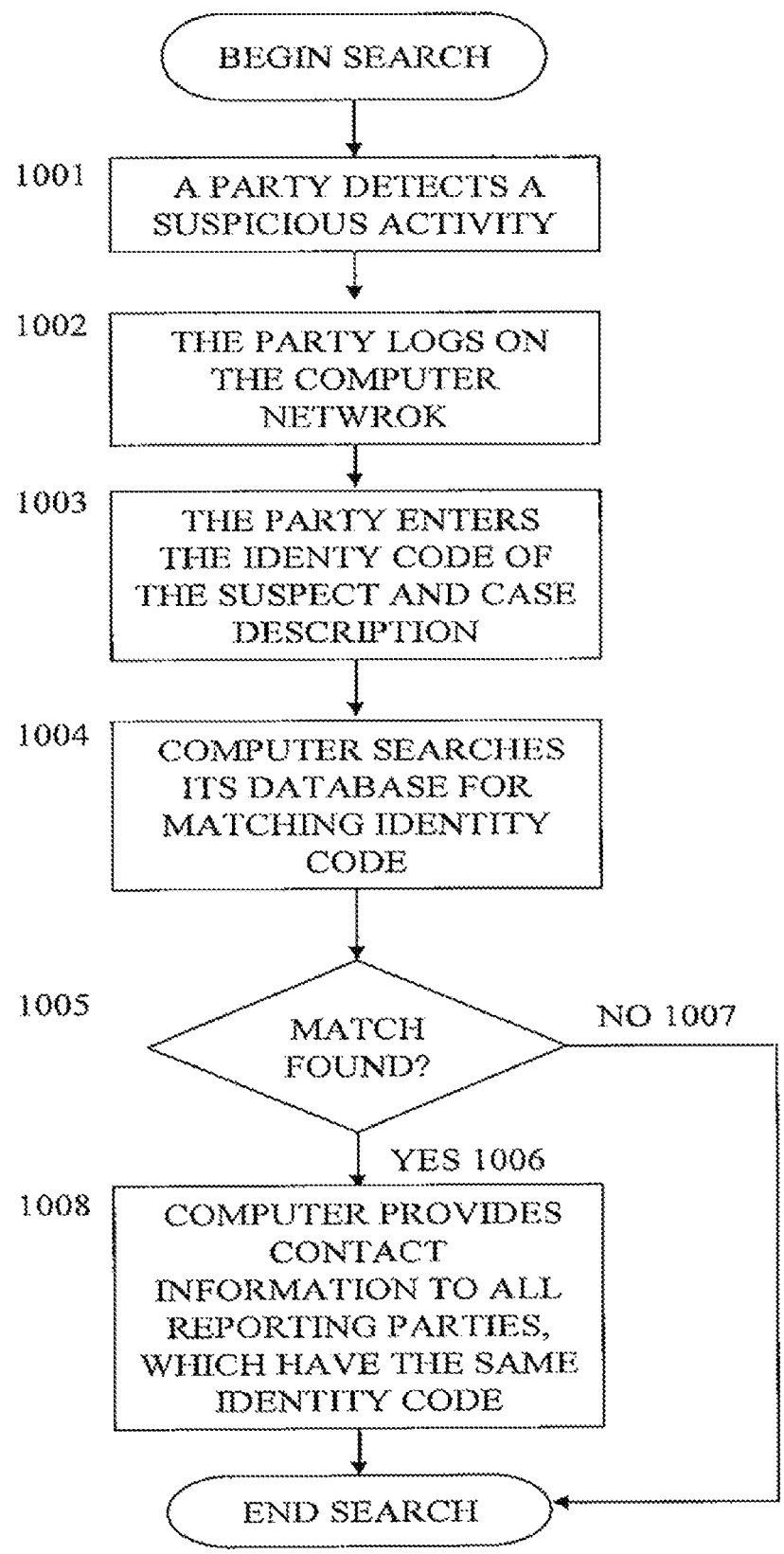
FIG. 2 is an exemplary flow chart showing how a party can log into the computer system, search for a common suspect, and obtain contact information to perform a joint investigation of suspicious activities of this suspect, using the computer system shown in FIG. 1.

Reference should now be made to the flowchart of FIG. 2 in combination with the system diagram of FIG. 1, which together illustrate how Reporting Financial Institution A 100 uses the computer system 300 to search for a suspect, relating to whom Reporting Financial Institution A 100 has detected suspicious activities (block 1001).

Then (block 1002), Reporting Financial Institution A 100 logs into the computer system 300 via network 400.

Reporting Financial Institution A 100 is prompted to form the identity code of the suspect and the case description into the computer system 300 (block 1003). The case description may include the category, the dollar amount, location, time frame, etc. of the suspicious activities.

FIG. 4 is an exemplary screen layout for the computer system to collect information from the user to form an identity code of an individual. FIG. 5 is an exemplary screen layout for the computer system to collect information from the user to form an identity code of an organization.

The computer system 300 searches its database to identify whether there is any existing case that has a matching identity code (block 1004).

After the search, the computer system 300 determines whether there is any match (decision block 1005). If a match is found ("YES" branch 1006 from decision block 1005), the computer system 300 informs Reporting Financial Institution A 100 of other parties that have reported the same identity code before (block 1008).

In general, two individuals or organizations are classified as "matched" if they have the same identity code, which is an encoded and/or encrypted form of numerical digits and letters collected from the identification information of the individuals or the organizations.

If Reporting Financial Institution B 200 has reported the same identity code before, the computer system 300 will also inform Reporting Financial Institution B 200 of the matching identity code and the contact information of Reporting Financial Institution A 100 via e-mail, fax, or other media, so that Reporting Financial Institution A 100 and Reporting Financial Institution B 200 can contact each other for a joint investigation.

On the other hand, if a match is not found ("NO" branch 1007 from the decision block 1005), no action may be necessary. The computer system 300 may then keep the identity code reported by Reporting Financial Institution A 100 for future comparisons.

Figure 3:
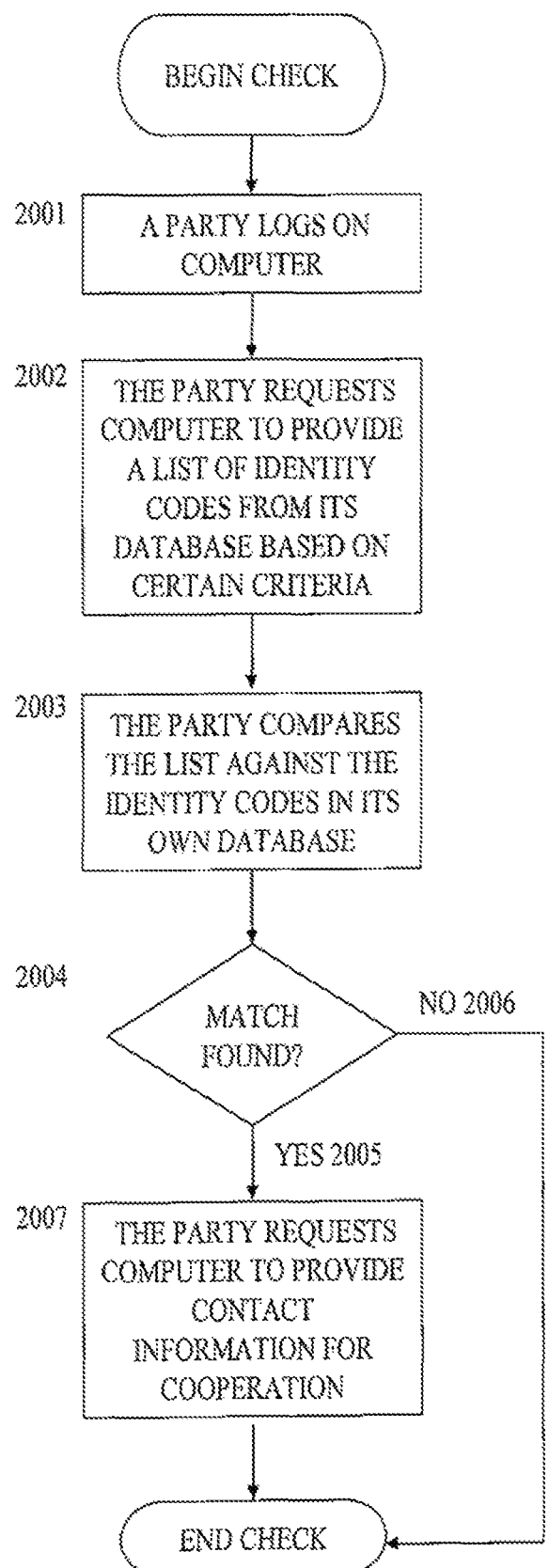
FIG. 3 is an exemplary flow chart showing how a party can obtain a list of identity codes and the party can then use that list to screen its existing database (e.g. customer database), using the computer system shown in FIG. 1.

References should also be made to the flowchart of FIG. 3 in combination with the system diagram of FIG. 1, which together illustrate how Reporting Financial Institution A 100 uses the computer system 300 to check whether it has any customer, who also has a record in the computer's database.

First (block 2001), Reporting Financial Institution A 100 logs into the computer system 300 via network 400.

Then (block 2002), Reporting Financial Institution A 100 requests the computer system 300 to provide a list of identity codes based on certain criteria.

For example, the criteria can be "Please list the identity codes of all suspects in the commercial loan category for suspicious activities reported from users in the State of Texas with dollar amount above $250,000 during July 2001 to May 2004."

After receiving the list (block 2003), Reporting Financial Institution A 100 compares the identity codes of its customers against this list provided by the computer system 300.

Reporting Financial Institution A 100 will take two different actions based on whether there is any match between the identity codes on the list and the identity codes of its customers (decision block 2004).

If there is no match ("NO" branch 2006 from the decision block 2004), the check is complete.

If there is a match ("YES" branch 2005 from the decision block 2004), Reporting Financial Institution A 100 can request the computer system 300 to provide more information about the matching identity code and the other reporting parties, which have reported the same identity code before (block 2007). A joint activity can be established among Reporting Financial Institution A 100 and other reporting parties to reach a particular purpose.

Those skilled in the art will undoubtedly recognize that the described aspects can be assembled in various ways to form a variety of applications based on the need, and that obvious alterations and changes in the described structure may be practiced without meaningfully departing from the principles, spirit and scope of the present disclosure. Accordingly, such alterations and changes should not be construed as substantial deviations from the present disclosure as set forth in the appended claims.

What is claimed is:

1. A method for determining whether another party has a same customer without disclosing personal identification information of the customer, comprising:
   encrypting, at a first computer system, a first set of data comprising personal identification information of a first person to generate a third set of data, the encryption rendering the first person unidentifiable from the third set of data;
   transmitting, from the first computer system to a third computer system, the third set of data;
   transmitting, from the third computer system to a second computer system, the third set of data;
   receiving, at the third computer system from the second computer system, a message indicating that the third set of data matches a fourth set of data encrypted from a second set of data comprising personal identification information of a second person, the encryption rendering the second person unidentifiable from the fourth set of data; and transmitting, from the third computer system to the first computer system, a message indicating that the second computer system has a set of data that matches the first set of data when the third set of data matches the fourth set of data.

2. The method of claim 1, in which the encryption further comprises at least one of selecting a portion of data, encoding data, or a combination thereof.

3. A method for determining whether a database of a different party stores personal identification information of a same person without disclosing the personal identification information, comprising:

encrypting, at a first database of a first party, a first set of data stored in the first database to generate a third set of data, the first set of data comprising personal identification information of a first person, the encryption rendering the first person unidentifiable from the third set of data;

transmitting, from the first party to a computer system, the third set of data;

transmitting, from the computer system to a second party, the third set of data;

receiving, at the computer system, a message indicating that the third set of data matches a fourth set of data generated by encrypting a second set of data stored in a second database of the second party, the second set of data comprising personal identification information of a second person, the encryption rendering the second person unidentifiable from the fourth set of data; and transmitting, from the computer system to the second party, a message indicating that the first party has a set of data that matches the second set of data when the third set of data matches the fourth set of data.

4. The method of claim 3, in which the encryption further comprises at least one of selecting a portion of data, encoding data, or a combination thereof.

5. A non-transitory computer-readable medium having program code recorded thereon to determine whether another party has personal identification information of a same person without disclosing the personal identification information, the program code comprising:

program code to encrypt, at a first computer system, a first set of data comprising personal identification information of a first person to generate a third set of data, the encryption rendering the first person unidentifiable from the third set of data;

program code to transmit, from the first computer system to a third computer system, the third set of data;

program code to receive, at the first computer system from the third computer system, a message indicating that the third set of data matches a fourth set of data encrypted from a second set of data comprising personal identification information of a second person, the encryption rendering the second person unidentifiable from the fourth set of data; and program code to transmit, from the first computer system to a second computer system, a message indicating that the second computer system has a set of personal identification information that matches the first set of personal identification information when the third set of data matches the fourth set of data.

6. The non-transitory computer-readable medium of claim 5, in which the encryption further comprises at least one of selecting a portion of data, encoding data, or a combination thereof.

7. A non-transitory computer-readable medium having program code recorded thereon to determine whether a database of a different party stores personal identification information of a same subject without disclosing the personal identification information, the program code comprising:

program code to encrypt, at a first database of a first party, a first set of personal identification information of a first subject stored in the first database to generate a third set of data, the encryption rendering the first subject unidentifiable from the third set of data;

program code to transmit, from the first party to a computer system, the third set of data;

program code to receive, at the first party from the computer system, a message indicating that the third set of data matches a fourth set of data generated by encrypting a second set of personal identification information of a second subject stored in a second database of a second party, the encryption rendering the second subject unidentifiable from the fourth set of data; and program code to transmit, from the first party to the second party, a message indicating that the second party has a subject corresponding to the first subject when the third set of data corresponds to the fourth set of data.

8. The non-transitory computer-readable medium of claim 7, in which the encryption further comprises at least one of selecting a portion of data, encoding data, or a combination thereof.

9. A first computer system for determining whether a second computer system has personal identification information of a same subject without disclosing the personal identification information, comprising:

a memory device; and at least one processor coupled to the memory device, the at least one processor configured:

to encrypt a first set of personal identification information of a first subject to generate a third set of data, the encryption rendering the first subject unidentifiable from the third set of data;

to transmit the third set of data to a third computer system;

to receive, from the third computer system, a message indicating that the third set of data matches a fourth set of data encrypted from a second set of personal identification information of a second subject, the encryption rendering the second subject unidentifiable from the fourth set of data; and to transmit, to the second computer system, a message indicating that the second computer system has a subject corresponding to the first subject when the third set of data corresponds to the fourth set of data.

10. The first computer system of claim 9, in which the encryption further comprises at least one of selecting a portion of data, encoding data, or a combination thereof.

11. A computer system for determining whether a database of a second party stores personal identification information of a same subject without disclosing the personal identification information, comprising:

a memory device; and at least one processor coupled to the memory device, the at least one processor configured:

to encrypt a first set of personal identification information of a first subject stored in a first database to generate a third set of data, the encryption rendering the first subject unidentifiable from the third set of data;

to transmit the third set of data to a third computer system;

to receive, from the third computer system, a message indicating that the third set of data matches a fourth set of data generated by encrypting a second set of personal identification information of a second subject stored in a second database of the second party, the encryption rendering the second subject unidentifiable from the fourth set of data; and to transmit, to the second party, a message indicating that the second party has a subject corresponding to the first subject when the third set of data corresponds to the fourth set of data.

12. The computer system of claim 11, in which the encryption further comprises at least one of selecting a portion of data, encoding data, or a combination thereof.

\* \* \* \* \*